US009278684B2

(12) United States Patent
Manickaraj et al.

(10) Patent No.: US 9,278,684 B2
(45) Date of Patent: Mar. 8, 2016

(54) METHOD AND SYSTEM FOR CONTROLLING A HYBRID VEHICLE

(71) Applicant: GM GLOBAL TECHNOLOGY OPERATIONS LLC, Detroit, MI (US)

(72) Inventors: Mark A. Manickaraj, Ajax (CA); Andrew M. Zettel, Port Moody (CA); Rick W. Szymczyk, Whitby (CA); Norman J. Weigert, Whitby (CA); Richard A. Marsh, Beverly Hills, MI (US); Kevin A. Dietrich, Linden, MI (US); Michael R. Colville, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 38 days.

(21) Appl. No.: 14/187,367

(22) Filed: Feb. 24, 2014

(65) Prior Publication Data

US 2015/0239460 A1 Aug. 27, 2015

(51) Int. Cl.
*B60W 10/06* (2006.01)
*B60W 10/08* (2006.01)
*B60W 10/26* (2006.01)
*B60W 20/00* (2006.01)

(52) U.S. Cl.
CPC ............. *B60W 20/106* (2013.01); *B60W 10/06* (2013.01); *B60W 10/08* (2013.01); *B60W 10/26* (2013.01); *B60W 20/40* (2013.01); *Y10S 903/93* (2013.01)

(58) Field of Classification Search
CPC ...... B60W 20/00; B60W 10/26; B60W 10/08; B60W 20/106; B60W 20/40; B60W 10/06
See application file for complete search history.

(56) References Cited

U.S. PATENT DOCUMENTS

| 2011/0066308 | A1* | 3/2011 | Yang et al. | 701/22 |
| 2011/0166731 | A1* | 7/2011 | Kristinsson et al. | 701/22 |
| 2011/0251744 | A1* | 10/2011 | Amano et al. | 701/22 |
| 2013/0169231 | A1* | 7/2013 | Hotta | 320/118 |
| 2014/0032034 | A1* | 1/2014 | Raptopoulos et al. | 701/25 |
| 2014/0184170 | A1* | 7/2014 | Jeong | 320/137 |

* cited by examiner

*Primary Examiner* — Calvin Cheung
*Assistant Examiner* — Martin Weeks
(74) *Attorney, Agent, or Firm* — Quinn Law Group, PLLC

(57) ABSTRACT

A method for controlling a hybrid vehicle includes the following: (a) receiving route data regarding a desired trip; (b) determining a load distribution along the desired trip based on the route data; (c) determining a load threshold based on the load distribution along the desired trip; (d) determining a charge depleting operating threshold based on a state of charge of the energy storage device; (e) commanding the powertrain to shift from a charge-depleting mode to a charge-sustaining mode when a load of the hybrid vehicle is equal to or greater than the load threshold; and (f) commanding the powertrain to shift from the charge-sustaining mode to the charge-depleting mode when the hybrid vehicle has traveled a distance that is greater than or equal to the charge-depleting operating threshold since the powertrain shifted from the charge-depleting mode to the charge-sustaining mode.

13 Claims, 3 Drawing Sheets

METHOD AND SYSTEM FOR CONTROLLING A HYBRID VEHICLE

TECHNICAL FIELD

The present disclosure relates to a method and system for controlling a hybrid vehicle.

BACKGROUND

A plug in hybrid vehicle includes a transmission, an internal combustion engine, and an electric motor or motors. Accordingly, the vehicle can be propelled by the internal combustion engine, the electric motor, or both. Sometimes, the vehicle may be solely driven by the electric motor.

SUMMARY

The hybrid vehicle can operate in a charge-depleting mode and a charge-sustaining mode. In a charge-depleting mode, the hybrid vehicle uses the electrical energy from an energy storage device (e.g., battery pack). In the charge-sustaining mode, the hybrid vehicle only uses energy primarily from the internal combustion engine. During operation, the hybrid vehicle can shift between the charge-depleting mode and the charge-sustaining mode. It is useful to use route information to control the shifts between the charge-depleting mode and charge-sustaining mode of the hybrid vehicle in order to optimize the use of electrical energy, minimize emissions, and maximize fuel economy.

The present disclosure relates to a method for controlling a plug in hybrid vehicle. The hybrid vehicle includes a powertrain. The powertrain includes an internal combustion engine, an electric-motor generator(s), a control module, and an energy storage device. The energy storage device is configured to supply electrical energy to the electric motor-generator. In an embodiment, the method includes the following steps: (a) receiving, via the control module, route data regarding a desired trip; (b) determining, via the control module, a load distribution along the desired trip based, at least in part, on the route data; (c) determining, via the control module, a load threshold based, at least in part, on the load distribution along the desired trip; (d) determining, via the control module, a charge depleting operating threshold based, at least in part, on a state of charge of the energy storage device; (e) commanding the powertrain, via the control module, to shift from a charge-depleting mode to a charge-sustaining mode when a load of the hybrid vehicle is equal to or greater than the load threshold, wherein the hybrid vehicle uses energy from the energy storage device when operating in the charge-depleting mode, and the hybrid vehicle only uses energy from the internal combustion engine when operating in the charge-sustaining mode; and (f) commanding the powertrain, via the control module, to shift from the charge-sustaining mode to the charge-depleting mode when the hybrid vehicle has traveled a distance that is greater than or equal to the charge-depleting operating threshold since the powertrain shifted from the charge-depleting mode to the charge-sustaining mode.

In another embodiment, the method includes the following steps: (a) receiving, via the control module, route data regarding a desired trip; (b) determining, via the control module, a load distribution along the desired trip based, at least in part, on the route data; (c) determining, via the control module, a load threshold based, at least in part, on the load distribution along the desired trip; (d) determining, via the control module, a charge-depleting operating threshold based, at least in part, on a state of charge of the energy storage device; (e) commanding the powertrain, via the control module, to adjust a charge-depletion rate from an initial charge-depletion rate to an adjusted charge-depletion rate when a load of the hybrid vehicle is equal to or greater than the load threshold, wherein the charge-depletion rate is a rate at which a state of charge of the energy storage device decreases when the hybrid vehicle uses energy from the internal combustion engine and the energy storage device; and (f) commanding the powertrain, via the control module, to adjust the charge-depletion rate from the adjusted charge-depletion to the initial charge depletion when the time elapsed since the powertrain adjusted the charge-depletion rate is greater than or equal to the charge-depleting operating threshold.

The present disclosure also relates to a hybrid vehicle. In an embodiment, the hybrid vehicle includes a vehicle body, a plurality of wheels operatively coupled to the vehicle body, and a powertrain. The powertrain includes an internal combustion engine, an electric motor-generator(s), and an energy storage device electrically connected to the electric motor-generator(s). The internal combustion engine is operatively coupled to at least one of the wheels. The electric motor-generator is operatively coupled to at least one of the wheels. The hybrid vehicle further includes a control module programmed to execute the following instructions: (a) receive route data regarding a desired trip; (b) determine a load distribution along the desired trip based, at least in part, on the route data; (c) determine a load threshold based, at least in part, on the load distribution along the desired trip; (d) determine a charge-depleting operating threshold based, at least in part, on a state of charge of the energy storage device, the predicted load distribution across the entire drive cycle (a method being using speed limits, vehicle model and trip length), determining with a simplified model the efficiency of the system using that model assuming charge depletion at the beginning of the cycle; recalculate the efficiency of the system with the engine starting during the first high load point in the drive cycle (a highway segment for instance); If the efficiency of the system is determined to be better when shifting the engine operation to earlier in the drive cycle, then proceed using the algorithm, otherwise disable. Because the trip length is known, a simplified output of model would yield a "fuel consumed" in grams for both late engine on and early engine on operation; (e) command the powertrain to shift from a charge-depleting mode to a charge-sustaining mode when a load of the hybrid vehicle is equal to or greater than the load threshold, wherein the hybrid vehicle uses energy from the energy storage device when operating in the charge-depleting mode, and the hybrid vehicle primarily uses energy from the internal combustion engine when operating in the charge-sustaining mode; and (f) command the powertrain to shift from the charge-sustaining mode to the charge-depleting mode when the energy remaining in the energy storage device equals the amount of energy predicted by the model to complete the trip, ensuring the vehicle ends the trip with an empty energy storage device.

The above features and advantages and other features and advantages of the present invention are readily apparent from the following detailed description of the best modes for carrying out the invention when taken in connection with the accompanying drawings.

DETAILED DESCRIPTION

Figure 1:
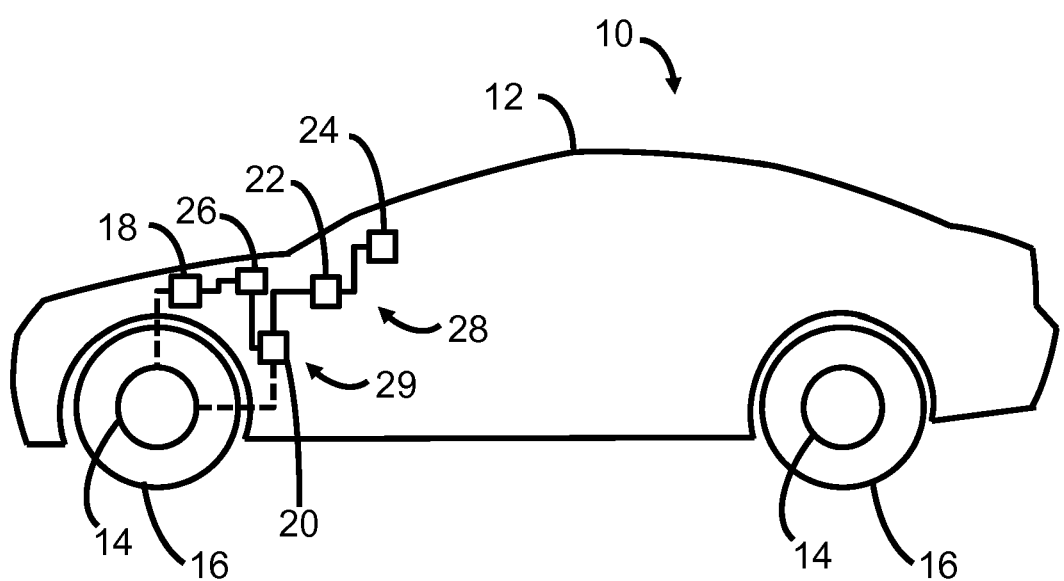
FIG. 1 is a schematic diagram of a hybrid vehicle.

Referring to the drawings in which like elements are identified with identical numerals throughout, FIG. 1 illustrates a hybrid vehicle 10. As non-limiting examples, the hybrid vehicle 10 may be a plug-in hybrid electric vehicle (PHEV) or an extended-range electric vehicle (EREV). In the depicted embodiment, the hybrid vehicle 10 includes a vehicle body 12 and a plurality of wheels 14 operatively coupled to the vehicle body 12. Each wheel 12 is coupled to a tire 16. The hybrid vehicle 10 further includes a powertrain 29. The powertrain 29 includes an internal combustion engine 18 operatively coupled to at least one of the wheels 14. In operation, the internal combustion engine 18 can propel the vehicle 10 by applying torque to the wheels 14. The powertrain 29 additionally includes an electric motor-generator 20 and an energy storage device 22 electrically connected to the electric motor-generator 20. The energy storage device 22 may be a battery, battery, pack, fuel cell, or a combination thereof and can supply electrical energy to the electric motor-generator 20. Aside from being electrically connected to the energy storage device 22, the electric motor-generator 20 is operatively coupled to the internal combustion engine 18 and can therefore receive mechanical energy (e.g., torque) from the internal combustion engine 18. The electric motor-generator 20 is also operatively coupled to at least one of the wheels 14 and can therefore be used to drive the wheels 14.

The electric motor-generator 20 can operate in motoring mode and generating mode. In motoring mode, the electric motor-generator 20 can convert electrical energy received from the energy storage device 22 and convert the electrical energy into mechanical energy (e.g., torque). When operating in the motoring mode, the electric motor-generator 20 can transmit mechanical energy (e.g., torque) to the wheels 14 in order to propel the vehicle 10. In generating mode, the electric motor-generator 20 can receive mechanical energy (e.g., torque) from the internal combustion engine 18 and converts the mechanical energy into electrical energy. The electrical energy generated by the electric motor-generator 20 can then be transmitted to the energy storage device 22.

The powertrain 29 and hybrid vehicle 10 can operate in a charge-depleting mode. In a charge-depleting mode, the hybrid vehicle 10 uses the electrical energy from the energy storage device 22. Accordingly, the electrical energy stored in the energy storage device 22 is depleted when the hybrid vehicle 10 is operated in the charge-depleting mode. As a non-limiting example, the hybrid vehicle 10 may only use the electrical energy stored in the energy storage device 22 when operating in the charge-depleting mode. Alternatively, the hybrid vehicle 10 may use energy from the internal combustion engine 18 and the energy storage device 22 when operating in the charge-depleting mode.

The powertrain 29 and hybrid vehicle 10 can also operate in a charge-sustaining mode. In the charge-sustaining mode, the hybrid vehicle 10 only uses the energy from the internal combustion engine 18 and, therefore, the electrical energy stored in the energy storage device 22 is not depleted. As a consequence, the state of charge (SOC) of the energy storage device 22 is maintained while the hybrid vehicle 10 operates in the charge-sustaining mode.

A navigation system 24 is coupled to the hybrid vehicle 10. The navigation system 24 may be part of the hybrid vehicle 10 or external to the hybrid vehicle 10. Regardless of its location, the navigation system 24 can receive input data from a user regarding a desired trip. In other words, the navigation system 24 can receive input data specific to the desired trip. The input data may include, but is not limited to, the destination of the desired trip. Upon receipt of the input data from the user, the navigation system 24 may determine route data specific to the desired trip. The route data may include, but is not limited to, a starting point, trip route (e.g., fastest route), trip distance, and travel time. As used herein, the term "trip distance" refers to a distance from the starting point to the destination of the desired trip.

The hybrid vehicle 10 further includes a control module 26 in electronic communication with the navigation system 24, electric motor-generator 20, and internal combustion engine 18. The terms "control module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. In the present disclosure, the control module 26 includes at least one processor and at least one associated memory and can receive route data relating to the desired trip from the navigation system 24. Accordingly, the control module 26 is in electronic communication with the navigation system 24. The navigation system 24 and control module 26 may be part of a system 28 for controlling the hybrid vehicle 10. The internal combustion engine 18, the electric motor-generator 20, control module 26, and energy storage device 22 may be part of the powertrain 29. The powertrain 29 is configured to propel the hybrid vehicle 10. The powertrain 29 can also operate in a charge-sustaining mode and a charge-depleting mode as discussed above with respect to the hybrid vehicle 10. The control module 26 is not necessarily part of the powertrain 29.

Figure 2:
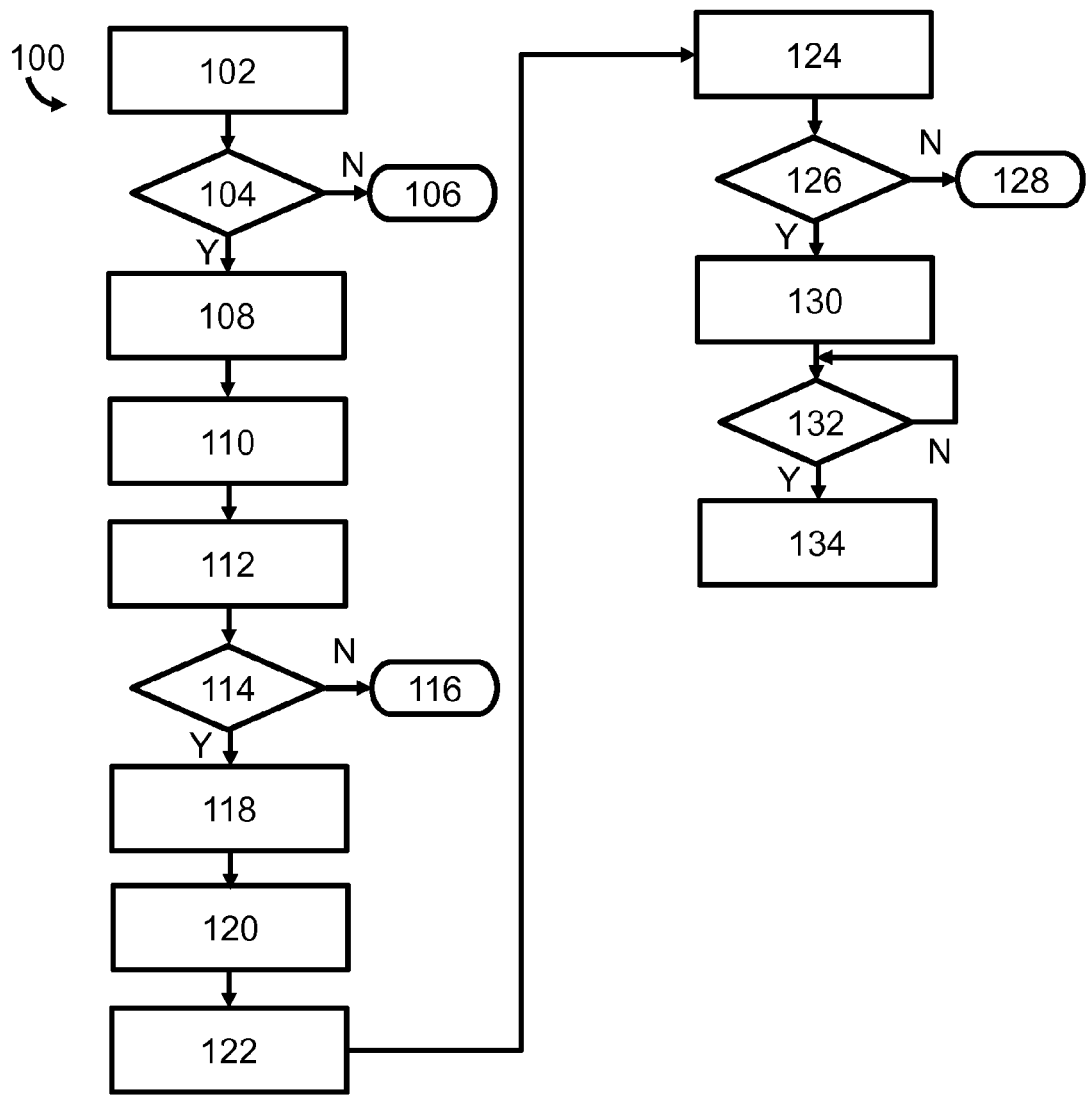
FIG. 2 is a flowchart illustrating a method for controlling a hybrid vehicle.
Figure 3:
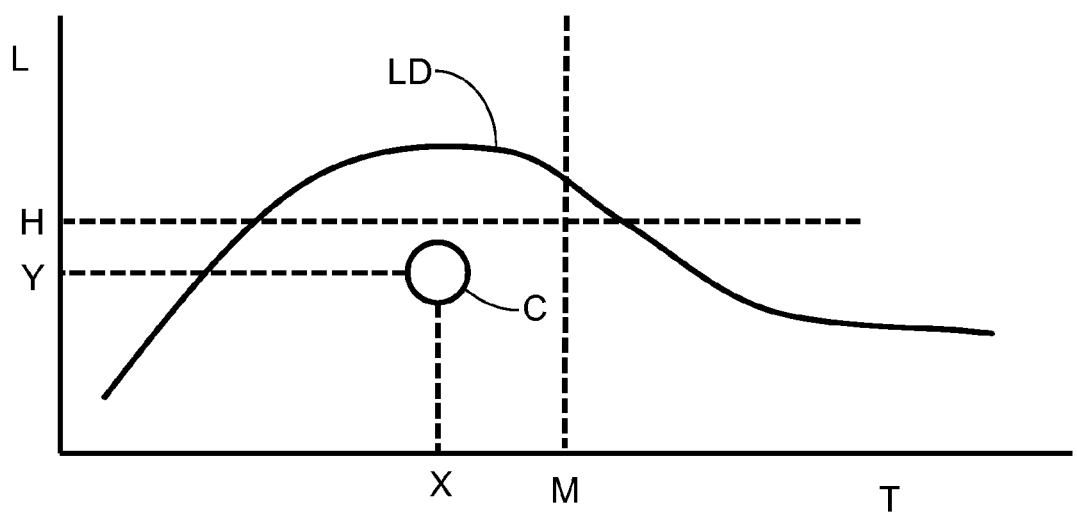
FIG. 3 is a graph of a load distribution for a driving cycle, wherein the horizontal axis represents time and the vertical axis represents load.

With reference to FIGS. 2 and 3, the control module 26 can execute the method 100 in order to optimize the use of electrical energy and minimize emissions originating from the internal combustion engine 18. The method 100 begins at step 102. Step 102 entails receiving, via the control module 26, route data about the desired trip. The route data includes, among other things, a desired destination. As discussed above, the control module 26 may receive the route data via the navigation system 24. If the control module 26 does not receive route data, then the method 100 ends.

After receiving the route data, the method 100 continues to step 104. Step 104 entails determining, via the control module 26 or navigation system 24, if the route data is sufficiently accurate to provide the user with a route corresponding to the desired trip. Accordingly, the control module 26, the navigation system 24, or both are configured and programmed to determine if the route data is sufficiently accurate to provide the user with a route corresponding to the desired trip. For example, the route data may not be sufficiently accurate to determine the starting point of the desired trip because the navigation system 24 is unable to determine the present location of the hybrid vehicle 10. If the route data is not sufficiently accurate to provide the user with a route corresponding to the desired trip, then the method 100 proceeds to step 106, where the method 100 ends. Conversely, if the route data is sufficiently accurate to provide the user with a route corresponding to the desired trip, then the method 100 proceeds to step 108.

Step 108 entails determining a route based, at least in part, on the route data inputted by the user. The navigation system 24 and/or control module 26 can determine the route that the hybrid vehicle 10 should take in order to reach a desired destination from a starting point. As a non-limiting example, the navigation system 24 may determine the fastest route to reach the desired destination from a starting point, which may be the current location of the hybrid vehicle 10. The route may include, among other things, trip length. The term "trip length" may refer to the travel distance or the travel time according to the route. Step 108 may therefore include determining the travel length (i.e., travel distance or travel time) based, at least in part, on the route data received in step 102. After determining the route, the method 100 proceeds to step 110.

Step 110 entails determining, via the control module 26, a driving cycle of the hybrid vehicle 10 based, at least in part, on the route data and the route determined in step 108. The "driving cycle" refers to a series of data points representing a speed of the hybrid vehicle 10 versus time along the desired trip. The speed of the hybrid vehicle 10 along the desired trip may depend, among other things, on speed limits and stop signs along the route. After determining the driving cycle, the method 100 continues to step 112.

Step 112 entails determining, via the control module 26, a charge-depleting range of the hybrid vehicle 10 based, at least in part, on the route data, the SOC of the energy storage device 22 and the driving cycle determined in step 110. In the present disclosure, the term "charge-depleting range" means the driving range (i.e., maximum distance or maximum time) that the hybrid vehicle 10 can travel along the route determined in step 108 when it is operated in the charge-depleting mode. The charge-depleting range may be expressed in terms of distance or time. As a non-limiting example, step 112 may entail determining the all-electric range (AER) of the hybrid vehicle 10 based, at least in part, on the SOC of the energy storage device 22, the route data, and the driving cycle determined in step 110. In this disclosure, the term "all-electric range" means the driving range (i.e., maximum driving distance or maximum driving time) that the hybrid vehicle 10 can travel only using energy from the energy storage device 22 for a given driving cycle. Next, the method 100 proceeds to step 114.

Step 114 entails comparing, via the control module 26, the charge-depleting range with the trip length (i.e., travel distance or travel time) corresponding to the route determined in step 112 in order to determine if the trip length is greater than the charge-depleting range. If the trip length is not greater than the charge-depleting range, then the method 100 proceeds to step 116, where the method 100 ends. Conversely, if the trip length is greater than the charge-depleting range, then the method 100 proceeds to step 118.

Step 118 entails determining, via the control module 26, the load distribution LD (FIG. 3) along the desired trip via the route determined in step 108 based, at least in part, on the route data received in step 102 and the driving cycle determined in step 110. Thus, step 118 entails determining the load distribution LD based, at least in part, on the driving cycle. As used herein, the "load distribution" refers to a series of data points representing a load L of the hybrid vehicle 10 versus time T for the driving cycle determined in step 110. The "load of the hybrid vehicle 10" refers to the power consumed by the hybrid vehicle 10. Accordingly, the "load distribution for the driving cycle determined in step 110" refers to the power consumed when the hybrid vehicle 10 travels along the desired route in accordance with the driving cycle determined in step 110. The load L of the hybrid vehicle 10 over the time T (or distance) for the driving cycle determined in step 110 depends, among other things, on the speed of the hybrid vehicle 10 along the desired route. The load distribution LD for the driving cycle may be determined using, for example, a load weighting algorithm. Then, the method 100 proceeds to step 120.

Step 120 entails determining, via the control module 26, the geometric center C of the two-dimensional region delimited by the load distribution LD and the horizontal axis representing time T. As discussed above, the "load distribution" refers to a series of data points representing a load L of the hybrid vehicle 10 versus time T along the route determined in step 108. This geometric center C may be the arithmetic mean ("average") position of all the data points in the load distribution LD for the driving cycle determined in step 110. Accordingly, step 120 may entail determining the arithmetic mean ("average") position of all the data points in the load distribution LD. The geometric center C may have a first coordinate Y corresponding to load L and a second coordinate X corresponding to time T or distance. Then, the method 100 continues to step 122.

Step 122 entails determining, via the control module 26, a load threshold H based, at least in part, on the geometric center C of the two-dimensional region defined by the load distribution, the charge-depleting range determined in step 112, the route data received in step 102, and the route determined in step 108. In other words, step 122 entails determining a load threshold H based, at least in part, on the arithmetic mean position (i.e., geometric center C) of all the data points in the load distribution for the driving cycle determined in step 110. The load threshold H may be referred to as a high load threshold, a maximum load threshold, or a first load threshold. For example, the load threshold H may be a load that is a certain amount above the first coordinate Y of the geometric center C. Step 122 may further include determining, via the control module 26, a minimum load threshold. The minimum load threshold may be referred to as the second load threshold or the low load threshold. The second load threshold may be, for example, a load that is a certain amount below the first coordinate Y of the geometric center C. Then, the method 100 continues to step 124.

Step 124 entails determining, via the control module 26, a charge-depleting operating threshold based, at least in part, on the charge-depleting range, the load threshold H, the geometric center C, and the state of charge (SOC) of the energy storage device 22. The "charge-depleting operating threshold" means the time or distance that the hybrid vehicle 10 will operate in the charge-depleting mode after the hybrid vehicle 10 reaches the high load threshold H. It is contemplated that the charge-depleting operating threshold may be a calibrated value.

Step 126 may include creating a driving profile using the speed limits from the navigation system 26. Then, the control module 26 running a first simulation of the desired trip in which the hybrid vehicle 10 begins the trip in the charge-depleting mode. Then, the control module 26 running a second simulation of the desired trip in which the powertrain 29 operates in the charge-sustaining mode when the load of the hybrid vehicle 10 reaches the load threshold H. Then, the control module 26 compares the fuel consumptions in the first and second simulations. If the fuel savings in the second simulation in comparison to the first simulation are equal to or greater than a predetermined fuel savings threshold, then method continues to step 130.

Step 126 alternatively entails comparing, via the control module 26, the second coordinate X of the geometric center C (i.e., arithmetic mean position) determined in step 120 to a midpoint M of the desired trip in order to determine if the second coordinate X of the geometric center C is less than the midpoint M of the desired trip. Specifically, the control module 26 determines if the second coordinate X of the geometric center C is less than the midpoint M of the desired trip. If the second coordinate X of the geometric center C is greater or equal to the midpoint M of the desired trip, then the method 100 proceeds to step 128, where the method 100 ends. On the other hand, if the second coordinate X of the geometric center C (i.e., arithmetic mean position) is less than the midpoint M of the desired trip, then the method 100 proceeds to step 130.

Step 130 entails commanding the powertrain 29, via the control module 26, to shift its operation from the charge-depleting mode to the charge-sustaining mode when the load L of the hybrid vehicle 10 is equal to or greater than the load threshold H, thereby maintaining the current SOC of the energy storage device 22. As discussed above, in the charge-sustaining mode, the hybrid vehicle 10 only uses the energy from the internal combustion engine 18 and, therefore, the electrical energy stored in the energy storage device 22 is not depleted. Therefore, in step 130, the control module 26 commands the powertrain 29 to use fuel energy and not to use energy from the energy storage device 22 when the load L reaches the load threshold H. Then, the method 100 continues to step 132.

Alternatively, the step 130 entails commanding the powertrain 29 to adjust (e.g., decrease) a charge-depletion rate from an initial charge-depletion rate to an adjusted charge-depletion rate when the load L of the hybrid vehicle 10 reaches the load threshold H. In the present disclosure, the term "charge-depletion rate" means the rate at which the SOC of the energy storage device 22 decreases when the hybrid vehicle 10 uses energy from the internal combustion engine 18 and the energy storage device 22 to propel the hybrid vehicle 10. To do so, the control module 26 may command the internal combustion engine 18 to increase its output torque and the electric motor-generator to decrease its output torque. Then, the method 100 continues to step 132.

Step 132 entails comparing, via the control module 26, the charge-depleting operating threshold with the distance traveled by the hybrid vehicle 10 or the time elapsed since shifting from the charge-depleting mode to the charge-sustaining mode at step 130. As discussed above, the charge-depleting operating threshold may be expressed in time or distance. Regardless, if the distance traveled by the hybrid vehicle 10 or the time elapsed since shifting from the charge-depleting mode to the charge-sustaining mode is not greater than the charge-depleting operating threshold, then the hybrid vehicle 10 continues to operate in the charge-sustaining mode. Conversely, if the distance traveled by the hybrid vehicle 10 or the time elapsed since shifting from the charge-depleting mode to the charge-sustaining mode is equal to or greater than the charge-depleting operating threshold, then the method continues to step 134.

Alternatively, step 132 entails comparing, via the control module 26, the charge-depleting operating threshold with the distance traveled by the hybrid vehicle 10 or the time elapsed since adjusting the charge-depletion rate. As discussed above, the charge-depleting operating threshold may be expressed in time or distance. Regardless, if the distance traveled by the hybrid vehicle 10 or the time elapsed since adjusting the charge-depletion rate is not greater than the charge-depleting operating threshold, then the hybrid vehicle 10 continues to operate in the adjusted charge-depletion rate or, alternatively, continues to adjust the charge-depletion rate. If the distance traveled by the hybrid vehicle 10 or the time elapsed since adjusting the charge-depletion rate is equal to or greater than the charge-depleting operating threshold, then the method 100 continues to step 134.

Step 134 may entail one of at least two options. As a non-limiting example, step 134 may entail commanding the powertrain 29, via the control module 26, to shift from the charge-sustaining mode to the charge-depleting mode if the distance traveled by the hybrid vehicle 10 or the time elapsed since shifting from the charge-depleting mode to the charge-sustaining mode is equal to or greater than the charge-depleting operating threshold or the load of the hybrid vehicle 10 is less than the second load threshold determined in step 122.

Alternatively, step 134 entails commanding the powertrain 29, via the control module 26, to adjust (e.g., increase) the charge-depletion rate from the adjusted charge-depletion rate to the initial charge-depletion rate if the distance traveled by the hybrid vehicle 10 or the time elapsed since shifting from the charge-depleting mode to the charge-sustaining mode is equal to or greater than the charge-depleting operating threshold or the load of the hybrid vehicle 10 is less than the second load threshold determined in step 122. To do so, the control module 26 can command the internal combustion engine 18 to decrease its output torque and the electric motor-generator to increase its output torque.

While the best modes for carrying out the invention have been described in detail, those familiar with the art to which this invention relates will recognize various alternative designs and embodiments for practicing the invention within the scope of the appended claims.

The invention claimed is:

1. A method of controlling a hybrid vehicle, the hybrid vehicle including a powertrain, the powertrain including an internal combustion engine, an electric-motor generator, a control module, and an energy storage device, the energy storage device being configured to supply electrical energy to the electric motor-generator, the method comprising:
receiving, via the control module, route data regarding a desired trip, the route data including a desired destination;
determining, via the control module, a load distribution along the desired trip based, at least in part, on the route data;
determining, via the control module, a driving cycle of the hybrid vehicle based, at least in part, on the route data, wherein the driving cycle is a series of data points representing a speed of the vehicle versus time for the desired trip, the load distribution is based, at least in part, on the driving cycle, and the load distribution is a series of data points representing a load of the hybrid vehicle versus time along the desired trip;
determining, via the control module, a load threshold based, at least in part, on the load distribution along the desired trip;
determining, via the control module, a charge-depleting operating threshold based, at least in part, on a state of charge of the energy storage device;
determining, via the control module, a charge-depleting range of the hybrid vehicle based, at least in part, on the route data, the state of charge of the energy storage device, and the driving cycle, wherein the load threshold is based, at least in part, on the charge-depleting range;

comparing, via the control module, the charge-depleting range with a trip length of the desired trip in order to determine if the trip length is greater than the charge-depleting range, wherein determining the load distribution is performed if the trip length is greater than the charge-depleting range, and the charge-depleting range is a driving range that the hybrid vehicle is capable of traveling along the route while operating in the charge-depleting mode;

determining an arithmetic mean position of all the data points in the load distribution, wherein the arithmetic mean position includes a first coordinate corresponding to the load of the hybrid vehicle and a second coordinate corresponding to time;

commanding the powertrain, via the control module, to shift from a charge-depleting mode to a charge-sustaining mode when a load of the hybrid vehicle is equal to or greater than the load threshold, wherein the hybrid vehicle uses energy from the energy storage device when operating in the charge-depleting mode, and the hybrid vehicle only uses energy from the internal combustion engine when operating in the charge-sustaining mode; and commanding the powertrain, via the control module, to shift from the charge-sustaining mode to the charge-depleting mode when the hybrid vehicle has traveled a distance that is greater than or equal to the charge-depleting operating threshold since the powertrain shifted from the charge-depleting mode to the charge-sustaining mode.

2. The method of claim 1, further comprising determining if the route data is sufficiently accurate to provide a user with a route corresponding to the desired trip.

3. The method of claim 2, further comprising determining a route based, at least in part, on the route data.

4. The method of claim 1, wherein the charge-depleting operating threshold is based, at least in part, on the charge-depleting range and the load threshold.

5. The method of claim 4, further comprising comparing the second coordinate of the arithmetic mean position to a midpoint of the desired trip in order to determine if the first coordinate is less than the midpoint of the desired trip.

6. The method of claim 5, wherein commanding the powertrain, via the control module, to shift from the charge-depleting mode to the charge-sustaining mode is conducted if the second coordinate of the arithmetic mean position is less than the midpoint of the desired trip.

7. The method of claim 1, wherein the load threshold is a first load threshold, and the method further comprises determining a second load threshold based on the charge-depleting range, and the powertrain is commanded to shift from the charge-sustaining mode to the charge-depleting mode when the load of the hybrid vehicle is less than the second load threshold.

8. A method of controlling a hybrid vehicle, the hybrid vehicle including a powertrain, the powertrain including an internal combustion engine, an electric-motor generator, a control module, and an energy storage device, the energy storage device being configured to supply electrical energy to the electric motor-generator, the method comprising:

receiving, via the control module, route data regarding a desired trip, the route data including a desired destination;

determining a route based, at least in part, on the route data;

determining, via the control module, a driving cycle of the hybrid vehicle based, at least in part, on the route, wherein the driving cycle is a series of data points representing a speed of the vehicle versus time for the desired trip;

determining, via the control module, a load distribution along the desired trip based, at least in part, on the route data;

determining, via the control module, a load threshold based, at least in part, on the load distribution along the desired trip;

determining, via the control module, a charge-depleting operating threshold based, at least in part, on a state of charge of the energy storage device;

commanding the powertrain, via the control module, to adjust a charge-depletion rate from an initial charge-depletion rate to an adjusted charge-depletion rate when a load of the hybrid vehicle is equal to or greater than the load threshold, wherein the charge-depletion rate is a rate at which a state of charge of the energy storage device decreases when the hybrid vehicle uses energy from the internal combustion engine and the energy storage device; and commanding the powertrain, via the control module, to adjust the charge-depletion rate from the adjusted charge-depletion to the initial charge depletion when a time elapsed since the powertrain adjusted the charge-depletion rate is greater than or equal to the charge-depleting operating threshold.

9. The method of claim 8, further comprising determining, via the control module, a charge-depleting range of the hybrid vehicle based, at least in part, on the route data, the state of charge of the energy storage device, and the driving cycle.

10. The method of claim 9, further comprising comparing, via the control module, the charge-depleting range with a trip length of the desired trip in order to determine if the trip length is greater than the charge-depleting range.

11. The method of claim 10, wherein determining the load distribution is performed if the trip length is greater than the charge-depleting range, wherein the charge-depleting range is a driving range that the hybrid vehicle can travel along the route while operating in the charge-depleting mode.

12. A hybrid vehicle, comprising:
a vehicle body;
a plurality of wheels operatively coupled to the vehicle body;
a powertrain including an internal combustion engine, an electric motor-generator, and an energy storage device electrically connected to the electric motor-generator, the internal combustion engine being operatively coupled to at least one of the wheels, the electric motor-generator being operatively coupled to at least one of the wheels;
a control module programmed to:
receive route data regarding a desired trip, the route data including a desired destination;
determine a load distribution along the desired trip based, at least in part, on the route data;
determine a driving cycle of the hybrid vehicle based, at least in part, on speed limits along the desired trip, wherein the driving cycle is a series of data points representing a speed of the vehicle versus time for the desired trip;
determine a load threshold based, at least in part, on the load distribution along the desired trip;
determine a charge-depleting operating threshold based, at least in part, on a state of charge of the energy storage device;

command the powertrain to shift from a charge-depleting mode to a charge-sustaining mode when a load of the hybrid vehicle is equal to or greater than the load threshold, wherein the hybrid vehicle uses energy from the energy storage device when operating in the charge-depleting mode, and the hybrid vehicle only uses energy from the internal combustion engine when operating in the charge-sustaining mode; and command the powertrain to shift from the charge-sustaining mode to the charge-depleting mode when the hybrid vehicle has traveled a distance that is greater than or equal to the charge-depleting operating threshold since the powertrain shifted from the charge-depleting mode to the charge-sustaining mode.

13. The method of claim 1, wherein the route data includes speed limits along the route, and the driving cycle is based, at least in part, on the speed limits along the route.

* * * * *